United States Patent
Ishimoto et al.

(10) Patent No.: US 8,971,022 B2
(45) Date of Patent: Mar. 3, 2015

(54) ELECTRODE FOIL AND METHOD FOR MANUFACTURING SAME, AND CAPACITOR

(75) Inventors: Hitoshi Ishimoto, Hyogo (JP); Masashi Shoji, Kyoto (JP); Hiroki Kamiguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/111,151

(22) PCT Filed: May 14, 2012

(86) PCT No.: PCT/JP2012/003123
§ 371 (c)(1),
(2), (4) Date: Oct. 10, 2013

(87) PCT Pub. No.: WO2012/157241
PCT Pub. Date: Nov. 22, 2012

(65) Prior Publication Data
US 2014/0036416 A1 Feb. 6, 2014

(30) Foreign Application Priority Data
May 16, 2011 (JP) ................................. 2011-109039

(51) Int. Cl.
| | |
|---|---|
| *H01G 4/06* | (2006.01) |
| *H01G 5/013* | (2006.01) |
| *H01G 9/00* | (2006.01) |
| *H01G 9/04* | (2006.01) |
| *H01G 9/042* | (2006.01) |
| *H01G 9/07* | (2006.01) |
| *H01G 9/045* | (2006.01) |
| *H01G 9/15* | (2006.01) |

(52) U.S. Cl.
CPC ................ *H01G 9/042* (2013.01); *H01G 9/07* (2013.01); *H01G 9/045* (2013.01); *H01G 9/0032* (2013.01); *H01G 9/151* (2013.01)
USPC .......................................... 361/524; 361/528

(58) Field of Classification Search
USPC .................................. 361/528, 530, 524, 523
See application file for complete search history.

(56) References Cited

U.S. PATENT DOCUMENTS

| | | | | |
|---|---|---|---|---|
| 6,075,691 | A * | 6/2000 | Duenas et al. | 361/321.5 |
| 6,107,195 | A * | 8/2000 | Gittleman et al. | 438/653 |
| 6,238,803 | B1 * | 5/2001 | Fu et al. | 428/472 |
| 6,865,071 | B2 * | 3/2005 | Katsir et al. | 361/523 |
| 6,972,473 | B2 * | 12/2005 | Beroz | 257/528 |

(Continued)

FOREIGN PATENT DOCUMENTS

| | | | |
|---|---|---|---|
| JP | 48-94859 A | * | 12/1973 |
| JP | 05-009790 | | 1/1993 |

(Continued)

OTHER PUBLICATIONS

International Search Report for PCT/JP2012/003123 mailed Aug. 14, 2012, with English Translation.

(Continued)

*Primary Examiner* — David M Sinclair
(74) *Attorney, Agent, or Firm* — McDermott Will & Emery LLP

(57) ABSTRACT

An electrode foil including a substrate made of metal material, a first layer made of metal oxide and formed on the substrate, a second layer made of TiNxOy (x>y>0) and formed on the first layer, and a third layer made of TiNxOy (0<x<y) and formed on the second layer.

17 Claims, 11 Drawing Sheets

(56) References Cited

U.S. PATENT DOCUMENTS

| | | | |
|---|---|---|---|
| 8,105,896 B2 * | 1/2012 | Bhat et al. | 438/240 |
| 2004/0114310 A1 | 6/2004 | Katsir et al. | |
| 2006/0146474 A1 | 7/2006 | Yoshimitsu et al. | |

FOREIGN PATENT DOCUMENTS

| | | |
|---|---|---|
| JP | 05-074664 | 3/1993 |
| JP | 2004-265951 A | 9/2004 |

OTHER PUBLICATIONS

Written Opinion of the International Search Authority for PCT/JP2012/003123 mailed Aug. 14, 2012.

English Translation of Chinese Search Report dated Dec. 3, 2014 for the related Chinese Patent Application No. 201280023561.2

* cited by examiner

ELECTRODE FOIL AND METHOD FOR MANUFACTURING SAME, AND CAPACITOR

RELATED APPLICATIONS

This application is the U.S. National Phase under 35 U.S.C. §371 of International Application No. PCT/JP2012/003123, filed on May 14, 2012, which in turn claims the benefit of Japanese Application No. 2011-109039, filed May 16, 2011, the disclosures of which are incorporated by reference herein.

TECHNICAL FIELD

The present invention relates to an electrode foil, a method for manufacturing the same, and a capacitor.

BACKGROUND ART

Capacitors such as a solid electrolytic capacitor and an aluminum electrolytic capacitor are used for personal computer and television. A solid electrolytic capacitor having low Equivalent Series Resistance (ESR) is used as peripheral equipment of CPU of personal computer. An aluminum electrolytic capacitor is used for back light of a liquid crystal television. Such capacitors have been demanded to have a smaller size and a larger capacity.

The aluminum electrolytic capacitor includes a capacitor element including an anode foil having a dielectric film on a surface thereof and a cathode foil having a dielectric film on a surface thereof, which are wound with a separator interposed therebetween. As the anode foil, an aluminum foil is used. Aluminum oxide as the dielectric film is formed by anodic oxidation of the aluminum foil.

Since aluminum oxide has a low dielectric constant and a low capacity, instead of aluminum oxide, titanium nitride oxide having a high dielectric constant has been considered to be formed as the dielectric film.

Examples of information on prior art documents related to the above include patent literatures 1 and 2.

CITATION LIST

Patent Literature

PTL 1: Japanese Patent Unexamined Publication No. 2004-265951
PTL 1: Japanese Patent Unexamined Publication No. H5-009790

SUMMARY OF THE INVENTION

An electrode foil of the present invention includes a substrate made of metal material, a first layer made of metal oxide and formed on the substrate, a second layer made of TiNxOy (x>y>0) and formed on the first layer, and a third layer made of TiNxOy (0<x<y) and formed on the second layer.

DESCRIPTION OF EMBODIMENTS

A dielectric constant of titanium nitride oxide used for a dielectric film of a conventional capacitor is higher as compared with that of aluminum oxide. However, the titanium nitride oxide is easily crystallized and has a low withstand voltage. Therefore, when the titanium nitride oxide is used for a capacitor, a leakage current is increased. A capacitor having a large capacity and less leakage current is described in this exemplary embodiment.

Example 1

Hereinafter, a wound-type aluminum electrolytic capacitor is described as an example in this Example, but an electrode foil of this Example may be used for other capacitors.

Figure 1:
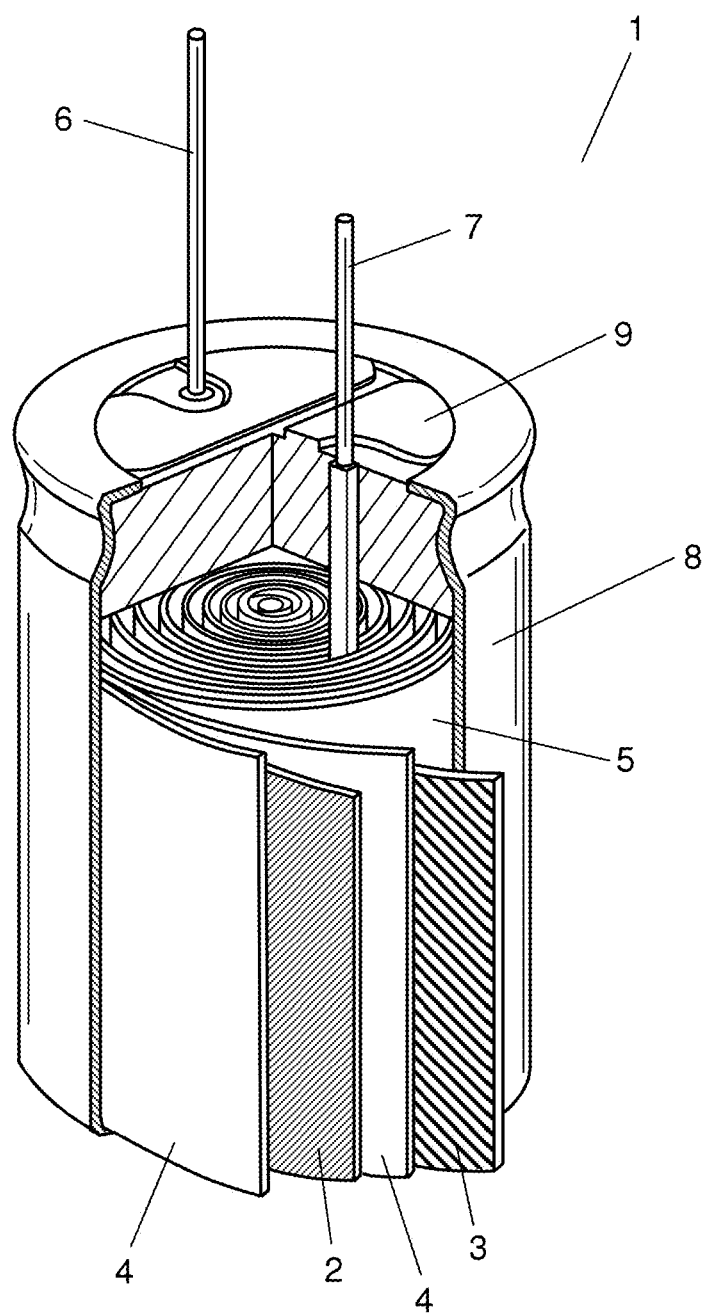
FIG. 1 is a partially cut-away perspective view of a capacitor in accordance with an exemplary embodiment of the present invention.

FIG. 1 is a partially cut-away perspective view of a capacitor in accordance with an exemplary embodiment of the present invention. Capacitor 1 includes capacitor element 5 in which an electrode foil as an anode part (hereinafter, referred to as "anode foil 2") and an electrode foil as a cathode part (hereinafter, referred to as "cathode foil 3") are wound with separator 4 interposed therebetween, and cathode material (not shown) with which capacitor element 5 is impregnated. Furthermore, capacitor 1 includes anode terminal 6 connected to anode foil 2, cathode terminal 7 connected to cathode foil 3, case 8 accommodating capacitor element 5 such that a part of anode terminal 6 and a part of cathode terminal 7 are exposed, and sealing member 9 for sealing case 8. As the cathode material, an electrolytic solution, a solid electrolyte including a conductive polymer, or the like, is used. Alternatively, cathode material combining an electrolytic solution and a solid electrolyte may be used.

Figure 2:
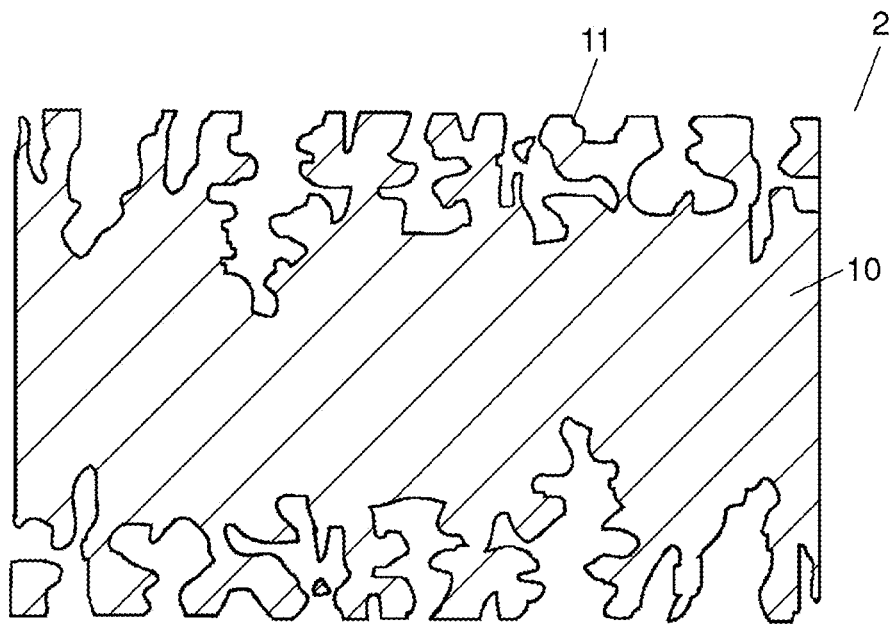
FIG. 2 is a sectional view of an anode foil as an electrode foil in accordance with the exemplary embodiment of the present invention.

FIG. 2 is a sectional view of the anode foil in accordance with the exemplary embodiment of the present invention. Anode foil 2 includes substrate 10, and dielectric film 11 formed on a surface of substrate 10. As substrate 10, aluminum is used. The surface of substrate 10 may be roughened by etching. Furthermore, aluminum particles may be laminated on the surface of substrate 10 by vapor deposition, plating, or the like, thus roughening the surface. Furthermore, as substrate 10, other than aluminum, metal such as silicon, titanium, nickel, and copper may be used.

Figure 3:
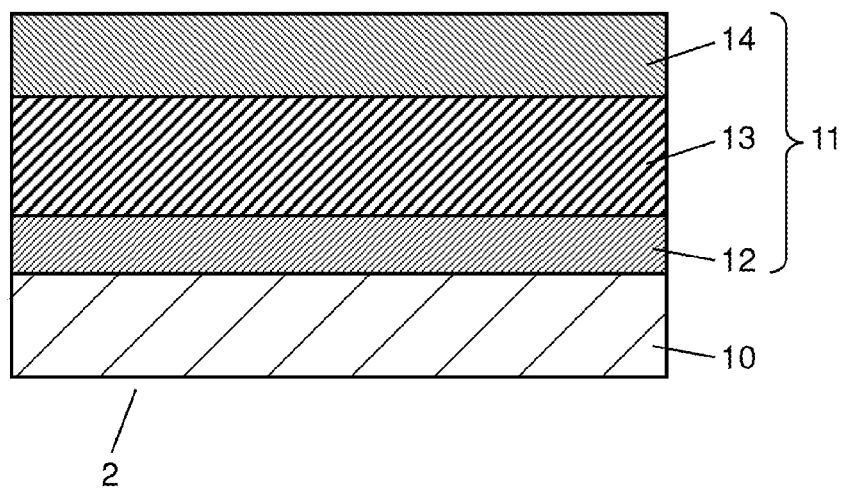
FIG. 3 is a schematic sectional view of the anode foil in accordance with the exemplary embodiment of the present invention.

FIG. 3 is a schematic sectional view of the anode foil in accordance with the exemplary embodiment of the present invention. For simplifying the description, the surface is flattened. Actually, however, as shown in FIG. 2, the surface is roughened in many cases. However, in capacitors having a small capacity or a small size, anode foil 2 whose surface is flattened may be used.

Dielectric film 11 is a laminated body including first layer 12 made of aluminum oxide and formed on substrate 10 made of aluminum, second layer 13 made of TiNxOy (x>y>0) and formed on first layer 12, and third layer 14 made of TiNxOy (0<x<y) and formed on second layer 13.

When metal other than aluminum, for example, silicon, titanium, nickel, copper, or the like, is used as substrate 10, first layer 12 is metal oxide such as silicon oxide, titanium oxide, nickel oxide, and copper oxide.

Figure 4:
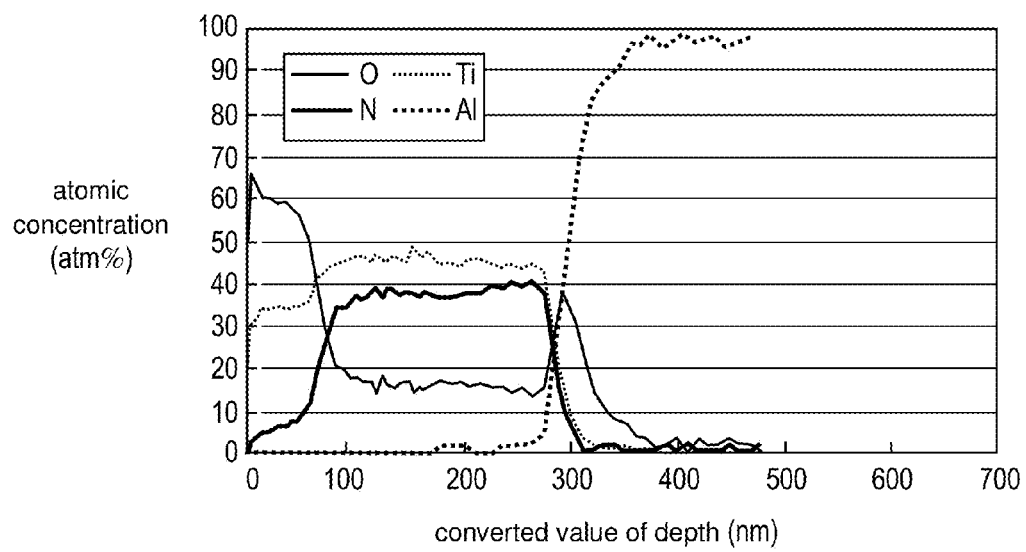
FIG. 4 is a graph showing a relation between a depth from a surface of the anode foil (converted value) and an atomic concentration in accordance with the exemplary embodiment of the present invention.

FIG. 4 shows a relation between a converted value (nm) of a depth (distance) from a surface of anode foil 2 and an atomic concentration (atm %) obtained from analysis results of X-ray photoelectron spectroscopy (XPS). The converted value of the depth from the surface of anode foil 2 is calculated by the below-mentioned method. The atomic concentration is determined by the XPS analysis by using a substrate on which a silicon dioxide film having a predetermined film thickness as a reference, and carrying out argon sputtering. Then, the relation between analysis time and a thickness can be derived from a time at which the atomic concentration of silicon is rapidly reduced and becomes substantially zero and the actual thickness of the silicon dioxide film. Then, by using the relation, from the analysis time of the atomic concentration of anode foil 2 of this Example, the converted value of the depth from the surface of anode foil 2 is calculated. Hereinafter, the depth from the surface of anode foil 2 shows the converted value of the depth, and the film thickness is a value calculated from the converted value.

According to FIG. 4, in a part from the surface of anode foil 2 to a depth of about 70 nm, the atomic concentration of oxygen is the highest, that of titanium is the second highest, followed by that of nitrogen. That is to say, a composition of this part is represented by TiNxOy (0<x<y), which shows third layer 14 of this Example.

In a part from a depth of about 70 nm to 290 nm from the surface of anode foil 2, the atomic concentration of titanium is the highest, and that of nitrogen is the second highest, followed by that of oxygen. That is to say, a composition of this part is represented by TiNxOy (x>y>0), which shows second layer 13 of this Example.

In a part from a depth of about 290 nm to 325 nm from the surface of anode foil 2, the atomic concentration of aluminum is the highest, and that of oxygen is the second highest, followed by that of nitrogen. That is to say, a composition of this part includes aluminum oxide as a main component, which shows first layer 12 of this Example.

As shown in FIG. 4, in this Example, the atomic concentration of oxygen has local maximum values in first layer 12 and third layer 14, respectively, in which the atomic concentration of oxygen is remarkably higher than that of nitrogen. That is to say, first layer 12 and third layer 14 are oxide layers. Second layer 13 is a nitride layer in which the atomic concentration of nitrogen is about 50% or more of that of titanium, and the atomic concentration of nitrogen is higher than that of oxygen.

In this Example, a thickness of first layer 12 is about 35 nm, a thickness of second layer 13 is 220 nm, and a thickness of third layer 14 is 70 nm. That is to say, third layer 14 is thinner than second layer 13, and first layer 12 is thinner than third layer 14.

Hereinafter, a method for forming dielectric film 11 in accordance with this Example is described. Firstly, etched substrate 10 is sputtered with titanium in the atmosphere of nitrogen gas and argon gas to form a titanium nitride layer on the surface of substrate 10. A film thickness of the titanium nitride layer is about 50 to 500 nm. At this time, by appropriately adjusting conditions such as conditions of gas (for example, gas ratio, gas flow rate), the degree of vacuum, a substrate temperature, and film formation time, the surface of the titanium nitride layer can be controlled.

Figure 5:
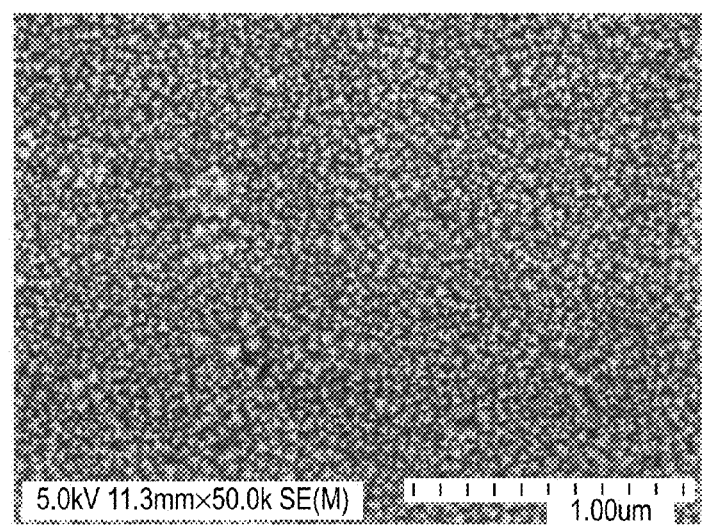
FIG. 5 is a SEM photograph of the anode foil before chemical conversion in accordance with the exemplary embodiment of the present invention.

FIG. 5 is a SEM photograph of the anode foil before chemical conversion in accordance with the exemplary embodiment of the present invention. The magnification is 50000 times. As shown in FIG. 5, the surface of the titanium nitride layer includes a plurality of conical protrusions 24 (see FIG. 18B), and has a high specific surface area. In 80% or more of protrusions 24, a diameter of the bottom surface is 10 nm or more and 150 nm or less, and the average diameter thereof is also 10 nm or more and 150 nm or less. In this Example, the titanium nitride layer is formed by sputtering, but the titanium nitride layer may be formed by other film formation processes such as vacuum deposition.

Thereafter, substrate 10 provided with the titanium nitride layer is subjected to anodic oxidation. In the anodic oxidation step, substrate 10 as an anode is placed in the electrolytic solution to be anodically oxidized, so that first layer 12, second layer 13, and third layer 14 are formed on the surface of substrate 10. As the electrolytic solution for chemical conversion, in this Example, 7% aqueous solution of ammonium adipate is used. Other than this, ammonium borate, ammonium phosphate, or the like, may be used. The conditions for chemical conversion include a chemical conversion voltage of 2V to 21V, retention time of 20 min, an electrolytic solution temperature of 70° C., and a constant current of 0.05 A/cm$^2$.

Figure 6:
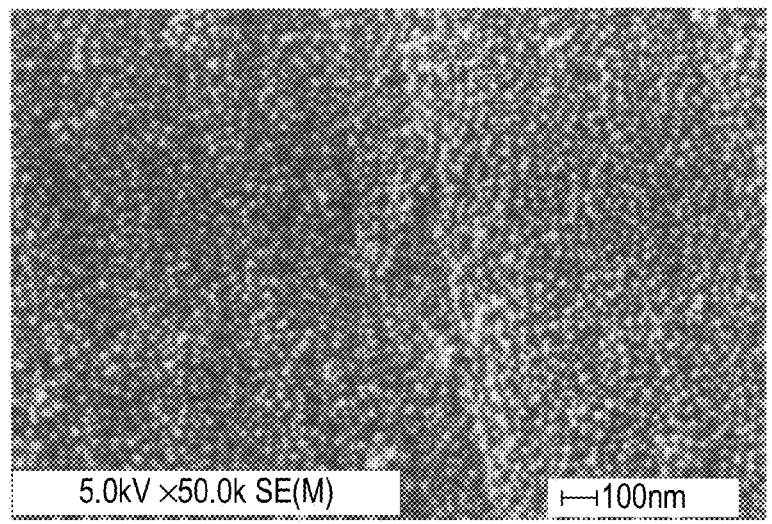
FIG. 6 is a SEM photograph of the anode foil after chemical conversion in accordance with the exemplary embodiment of the present invention.

FIG. 6 is a SEM photograph of the anode foil after chemical conversion in accordance with the exemplary embodiment of the present invention. The magnification is 50000 times. As shown in FIG. 6, in anode foil 2 after chemical conversion, each of protrusions 24 formed on the surface has a round shape at the tip thereof, that is, has a dome shape. The size itself of each protrusion 24 is hardly changed before and after chemical conversion, and an average diameter of the bottom surface is 10 nm or more and 150 nm or less.

Anode foil 2 of this Example, which is formed as mentioned, is cut into about 1 cm×2 cm, one surface is insulated by masking in the condition that a projected area is 2 cm², and the other surface is measured for a leakage current value (μA) and a capacity (μF). In the aqueous solution of ammonium adipate at 30° C., a constant voltage of 3.15 V is applied and a leakage current value after three minutes is measured.

The capacity is a value measured in 15% aqueous solution of ammonium adipate at a frequency of 120 Hz by an LCR meter.

Comparative Example 1

Figure 7:
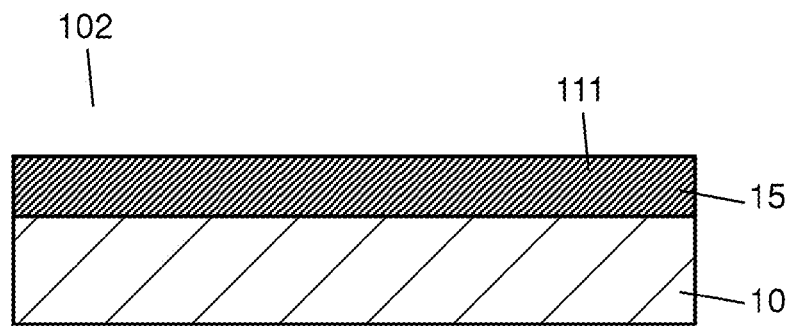
FIG. 7 is a schematic sectional view of an anode foil in Comparative Example 1.

FIG. 7 is a schematic sectional view of an anode foil in Comparative Example 1. Anode foil 102 includes substrate 10 made of aluminum, and aluminum oxide layer 15 formed on the surface of substrate 10. That is to say, dielectric film 111 is made of aluminum oxide. Anode foil 102 is formed by subjecting etched substrate 10 to anodic oxidation without forming a titanium nitride layer on etched substrate 10.

Substrate 10 of Comparative Example 1 is not provided with conical protrusions 24 having sharpened tip ends as in Example 1.

Figure 8:
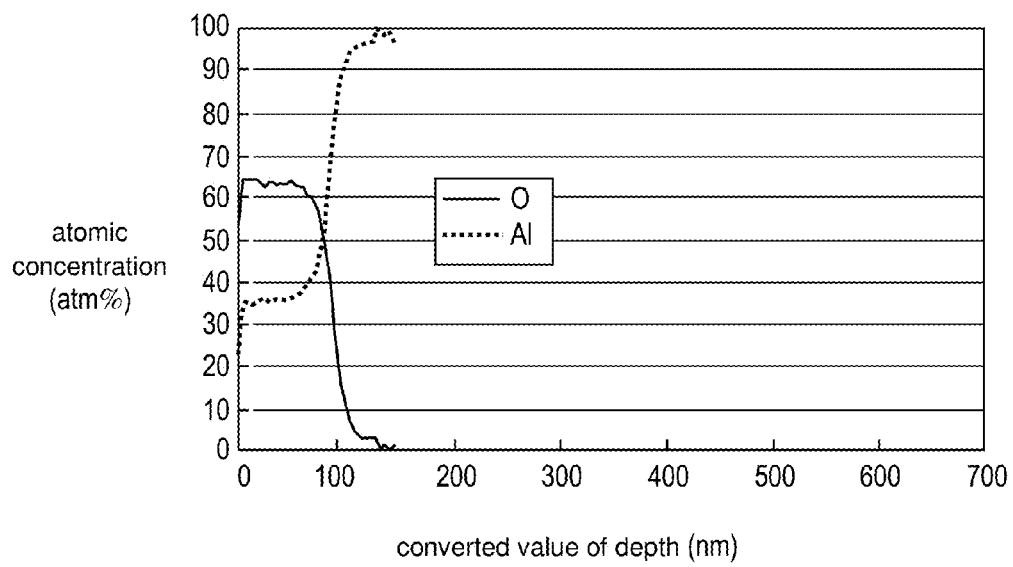
FIG. 8 is a graph showing a relation between a depth from a surface of the anode foil (converted value) and an atomic concentration in Comparative Example 1.

FIG. 8 is a graph showing a relation between a depth from a surface of the anode foil (converted value) and an atomic concentration in Comparative Example 1. As is apparent from the XPS analysis data in FIG. 8, in Comparative Example 1, in a part from a surface of anode foil 102 to a depth of about 85 nm, the atomic concentration of oxygen is the highest, followed by that of aluminum. In a depth of more than 85 nm, the main component is aluminum, and the atomic concentration of oxygen becomes substantially zero. That is to say, dielectric film 111 of Comparative Example 1 is formed of aluminum oxide layer 15 having a thickness of about 85 nm.

Since the etching step, the chemical conversion step, and the like, are carried out in the same conditions as in Example 1, the description thereof is omitted.

Comparative Example 2

Figure 9:
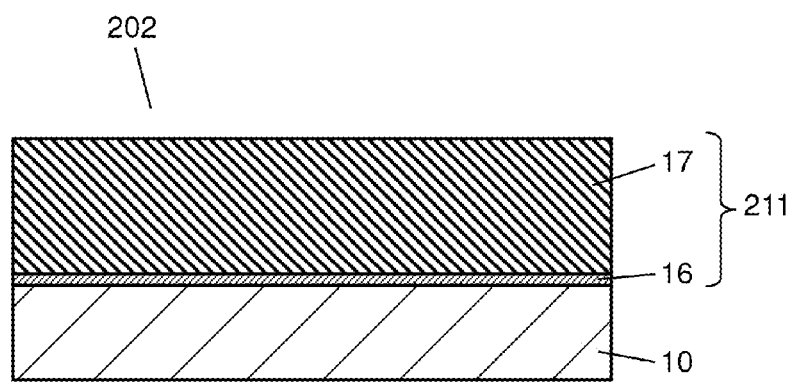
FIG. 9 is a schematic sectional view of an anode foil in Comparative Example 2.

FIG. 9 is a schematic sectional view of an anode foil in Comparative Example 2. Anode foil 202 includes substrate 10 made of aluminum, thin natural oxide film 16 formed on a surface of substrate 10, and titanium dioxide layer 17 formed on natural oxide film 16. Since natural oxide film 16 is made of aluminum oxide, but it is extremely thin, for example, about several nm thick, dielectric film 211 is formed of titanium dioxide layer 17 substantially entirely. Anode foil 202 is formed by forming a titanium layer by sputtering etched substrate 10 with titanium in the presence of argon gas, followed by anodic oxidation.

Figure 10:
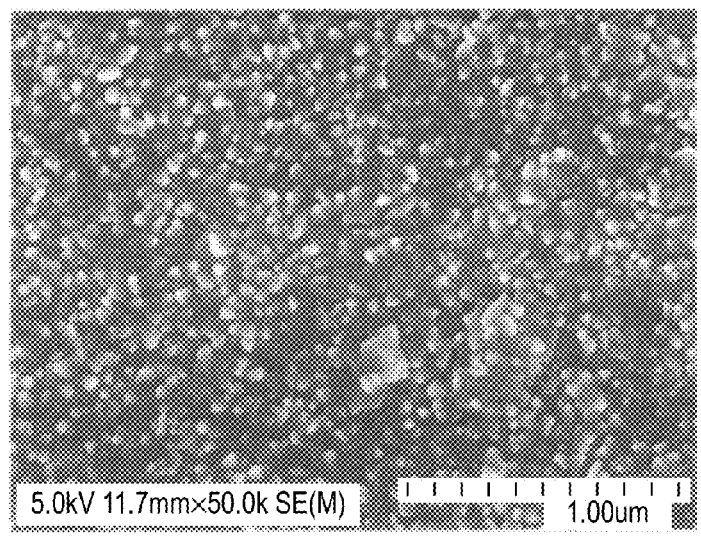
FIG. 10 is a SEM photograph of the anode foil before chemical conversion in Comparative Example 2.

FIG. 10 is a SEM photograph of the anode foil before chemical conversion in Comparative Example 2. The magnification is 50000 times. In Comparative Example 2, even when a titanium layer is formed, conical protrusions 24 having sharpened tips as in Example 1 are not formed, but scale-like projections and depressions are formed as shown in FIG. 10. Therefore, the surface of titanium dioxide layer 17 after chemical conversion does not have protrusions 24 as in Example 1.

Figure 11:
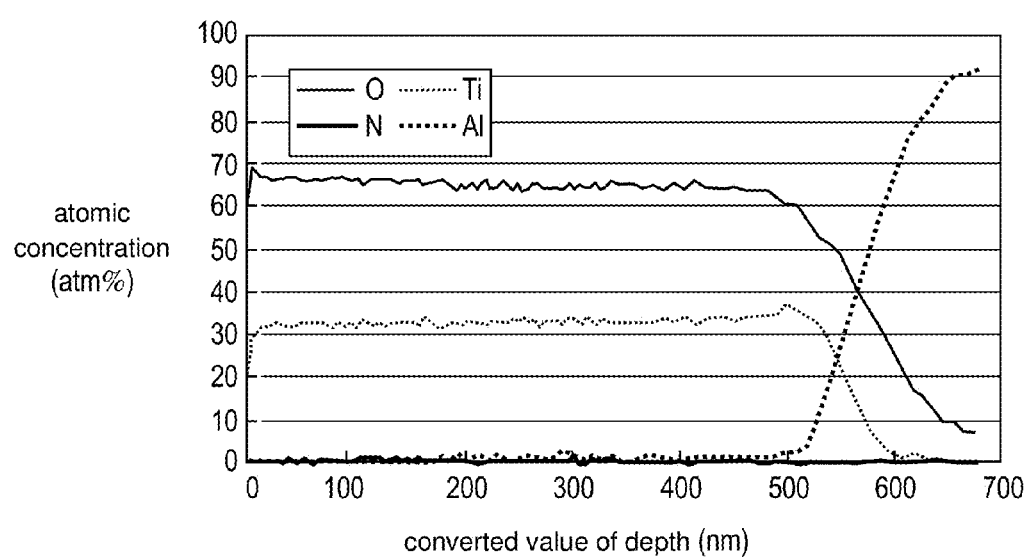
FIG. 11 is a graph showing a relation between a depth from a surface of the anode foil (converted value) and an atomic concentration in Comparative Example 2.

FIG. 11 is a graph showing a relation between a depth from a surface of the anode foil (converted value) and an atomic concentration in Comparative Example 2. As is apparent from the XPS analysis data of FIG. 11, in Comparative Example 2, a part from the surface of anode foil 202 to a depth of about 560 nm is titanium dioxide layer 17 in which the atomic concentration of oxygen is the highest and that of titanium is the second highest. In a part at a depth of more than 560 nm, the main component is aluminum. That is to say, dielectric film 211 of Comparative Example 2 is made of titanium dioxide layer 17 having a thickness of about 560 nm.

Since the etching step, the chemical conversion step, and the like, are carried out in the same conditions as in Example 1, the description thereof is omitted.

Comparative Example 3

Figure 12:
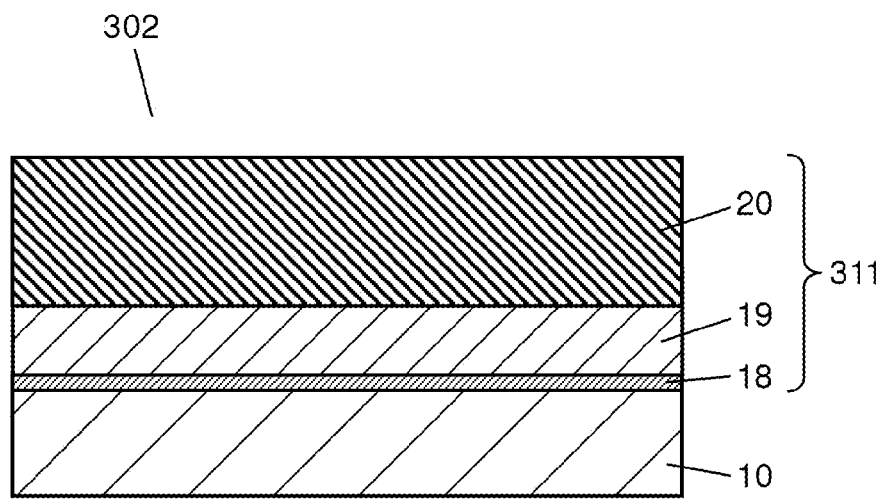
FIG. 12 is a schematic sectional view of an anode foil in Comparative Example 3.

FIG. 12 is a schematic sectional view of an anode foil in Comparative Example 3. Anode foil 302 includes substrate 10 made of aluminum, thin natural oxide film 18 formed on a surface of substrate 10, titanium oxide layer 19 formed on natural oxide film 18, and titanium dioxide layer 20 formed on titanium oxide layer 19. Both titanium oxide layer 19 and titanium dioxide layer 20 contain a slight amount of nitrogen atoms. Since natural oxide film 18 is extremely thin, a composition of dielectric film 311 includes, as main components, titanium oxide layer 19 and titanium dioxide layer 20 both of which contain a slight amount of nitrogen atoms, and is represented by TiNxOy (0<x<<y).

Anode foil 302 is formed by sputtering etched substrate 10 with titanium in the presence of argon gas and nitrogen gas so as to form a titanium nitride layer, followed by anodic oxidation.

Figure 13:
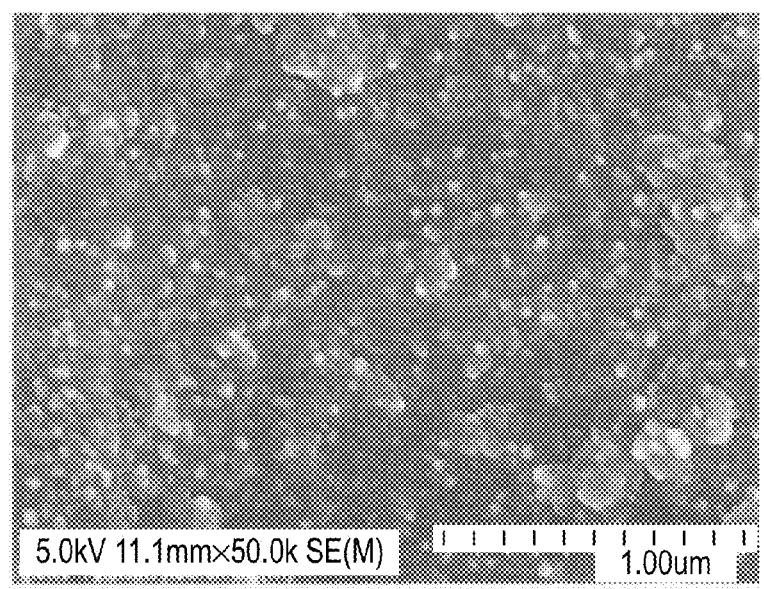
FIG. 13 is a SEM photograph of the anode foil before chemical conversion in Comparative Example 3.

FIG. 13 is a SEM photograph of the anode foil before chemical conversion in Comparative Example 3. The magnification is 50000 times. In Comparative Example 3, even when the titanium nitride layer is formed, tip-sharpened conical protrusions 24 as in Example 1 are not formed, but scale-like projections and depressions as shown in FIG. 13 are formed. Therefore, protrusions 24 as in Example 1 are not formed on the surface of titanium dioxide layer 20 also after chemical conversion.

Figure 14:
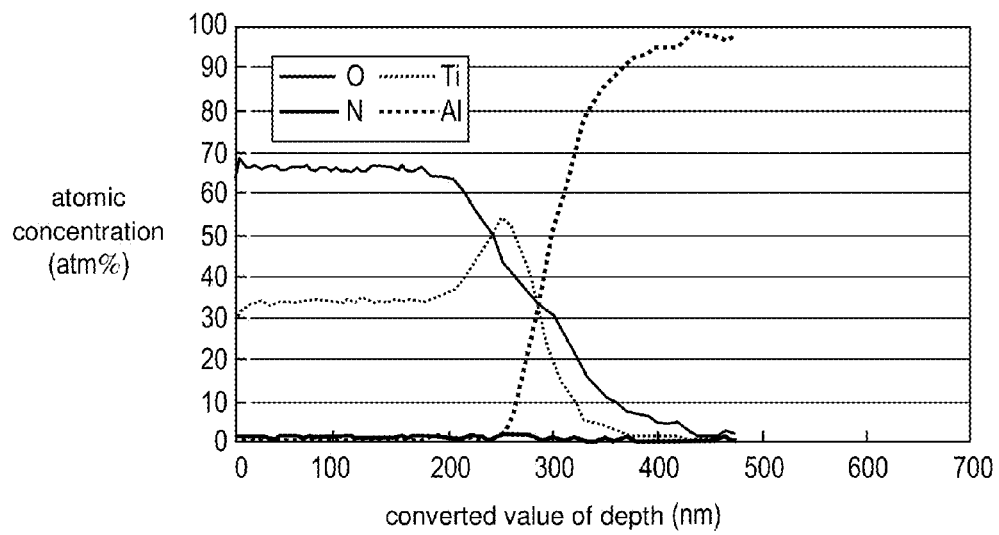
FIG. 14 is a graph showing a relation between a depth from a surface of the anode foil (converted value) and an atomic concentration in Comparative Example 3.

FIG. 14 is a graph showing a relation between a depth from a surface of the anode foil (converted value) and an atomic concentration in Comparative Example 3. As is apparent from the XPS analysis data in FIG. 14, in Comparative Example 3, a part from the surface of anode foil 302 to a depth of about 230 nm is titanium dioxide layer 20. In this part, the atomic concentration of oxygen is the highest, and that of titanium is the second highest. Furthermore, this part includes a very small amount such as less than 5 atm % of nitrogen atoms. A part from the depth of about 230 nm to 295 nm is titanium oxide layer 19. In this part, the atomic concentration of titanium is the highest and that of oxygen is the second highest. Also titanium oxide layer 19 includes a very small amount such as less than 5 atm % of nitrogen atoms. A range deeper than a depth of 295 nm corresponds to substrate 10, which includes aluminum as a main component.

That is to say, dielectric film 311 of Comparative Example 3 includes titanium oxide layer 19 having a thickness of about 65 nm and titanium dioxide layer 20 having a thickness of about 230 nm. Both titanium oxide layer 19 and titanium dioxide layer 20 include a slight amount of nitrogen atoms. Since the atomic concentration of oxygen is gradually reduced with the increase of a depth from a surface of anode foil 2 to a part deeper than a depth of 230 nm, it is not observed that the atomic concentration of oxygen is increased again as found in FIG. 4.

Since the etching step, the chemical conversion step, and the like, are carried out in the same conditions as in Example 1, the description thereof is omitted.

Comparative Example 4

Figure 15:
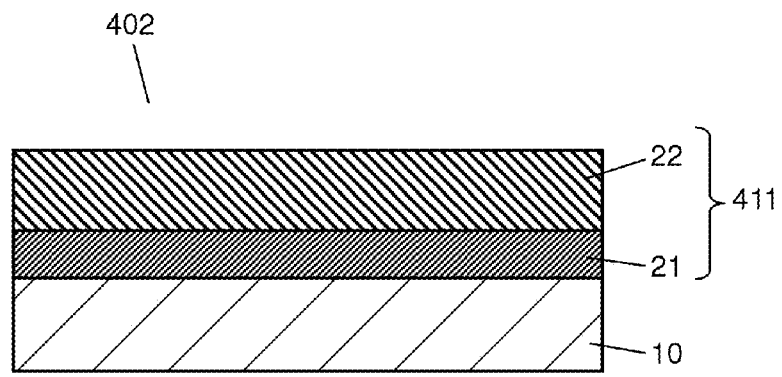
FIG. 15 is a schematic sectional view of an anode foil in Comparative Example 4.

FIG. 15 is a schematic sectional view of an anode foil in Comparative Example 4. Anode foil 402 includes substrate 10 made of aluminum, aluminum oxide layer 21 formed on a surface of substrate 10, and titanium dioxide layer 22 formed on aluminum oxide layer 21. Titanium dioxide layer 22 includes titanium dioxide as a main component, and contains a slight amount of nitrogen atoms. That is to say, dielectric film 411 includes aluminum oxide layer 21 and titanium dioxide layer 22 represented by TiNxOy (0<x<<y).

Anode foil 402 is formed by sputtering etched substrate 10 with titanium in the presence of argon gas and nitrogen gas so as to form a titanium nitride layer, followed by anodic oxidation.

Figure 16:
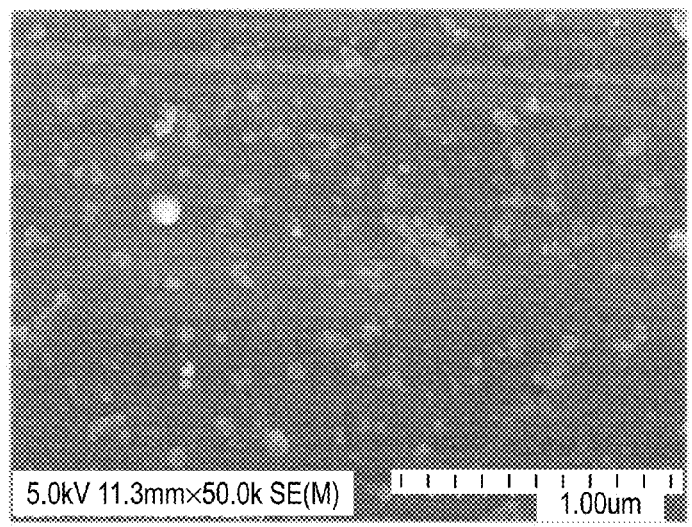
FIG. 16 is a SEM photograph of the anode foil before chemical conversion in Comparative Example 4.

FIG. 16 is a SEM photograph of the anode foil before chemical conversion in Comparative Example 4. The magnification is 50000 times. In Comparative Example 4, even when a titanium nitride layer is formed, conical protrusions 24 are not formed. Therefore, protrusions 24 as in Example 1 are not formed on the surface of titanium dioxide layer 22 after chemical conversion.

Figure 17:
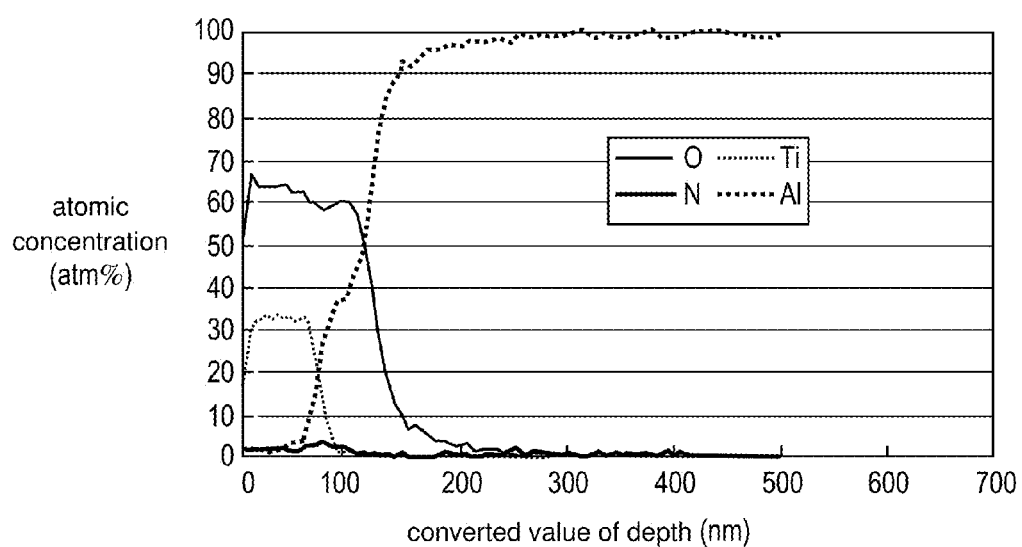
FIG. 17 is a graph showing a relation between a depth from a surface of the anode foil (converted value) and an atomic concentration in Comparative Example 4.

FIG. 17 is a graph showing a relation between a depth from a surface of the anode foil (converted value) and an atomic concentration in Comparative Example 4. As is apparent from the XPS analysis data in FIG. 17, in Comparative Example 4, a part from the surface of anode foil 402 to a depth of about 70 nm is titanium dioxide layer 22. In this part, the atomic concentration of oxygen is the highest, and that of titanium is the second highest. Furthermore, this part includes a very small amount such as less than 5 atm % of nitrogen atoms. A part from the depth of about 70 nm to 120 nm is aluminum oxide layer 21. In this part, the atomic concentration of oxygen is the highest, and that of aluminum is the second highest. In a range deeper than 120 nm, the main component is aluminum.

That is to say, dielectric film 411 of Comparative Example 4 includes aluminum oxide layer 21 having a thickness of about 50 nm, and dioxide layer 22 including a slight amount of nitrogen atoms and having a thickness of about 70 nm. Since the atomic concentration of oxygen is gradually reduced with the increase of the depth from a surface of anode foil 402 to the depth of about 120 nm, it is not observed that the atomic concentration of oxygen is increased again as found in FIG. 4.

Since the etching step, the chemical conversion step, and the like are carried out in the same conditions as in Example 1, the description thereof is omitted.

Table 1 shows leakage current values of Example 1 and Comparative Examples 1 to 4 in each chemical conversion voltage. Table 2 shows capacity ratios of Example 1 and Comparative Examples 1 to 4 in each chemical conversion voltage. The capacity ratio is a relative value when electrostatic capacity (μF) in Comparative Example 1 is defined as 1.

TABLE 1

| Chemical conversion voltage (V) | Leakage current (μA) | | | | |
|---|---|---|---|---|---|
| | Example 1 | Comparative example 1 | Comparative example 2 | Comparative example 3 | Comparative example 4 |
| 2 | 30 | 40 | 20 | 20 | 30 |
| 4.5 | 20 | 40 | 100 | 70 | 10 |
| 9 | 20 | 40 | 2370 | 5510 | 30 |
| 15 | 20 | 60 | 10900 | 11680 | 10 |
| 21 | 30 | 120 | 1710 | 1380 | 10 |

TABLE 2

| Chemical conversion voltage (V) | Capacity ratio | | | | |
|---|---|---|---|---|---|
| | Example 1 | Comparative example 1 | Comparative example 2 | Comparative example 3 | Comparative example 4 |
| 2 | 3.98 | 1 | 11 | 7.8 | 0.88 |
| 4.5 | 1.83 | 1 | 15 | 8.5 | 0.87 |
| 9 | 1.52 | 1 | 23 | 11.8 | 1.04 |
| 15 | 1.20 | 1 | 39 | 11.2 | 0.92 |
| 21 | 1.34 | 1 | 43 | 7.2 | 1.03 |

Hereinafter, an effect of Example 1 is described. In Example, 1, as shown in Table 1, the leakage current value can be suppressed to the same level as in Comparative Example 1 in which dielectric film 111 is formed of aluminum oxide layer 15. Furthermore, in Example 1, as shown in Table 2, the electrostatic capacity can be increased.

The reason why the capacity can be increased is because a dielectric constant can be increased by third layer 14 and the surface area is remarkably enlarged.

The reason why the surface area is enlarged is thought to be as follows. In Comparative Example 4 which does not include second layer 13 including TiNxOy (x>y>0), protrusions are not formed and the capacity is low. On the other hand, it is thought that the titanium nitride layer provided with second layer 13 after anodic oxidation includes an appropriate amount of nitrogen atoms and is changed in the crystalline structure, so that a large number of conical protrusions 24 are formed. Therefore, protrusions 24 remain also on the surface of third layer 14 after chemical conversion. As a result, the surface area is remarkably enlarged, and thus the capacity is improved.

Furthermore, the dielectric constant can be increased and a large capacity can be achieved by third layer 14 made of TiNxOy (0<x<y).

In addition, since oxygen of third layer 14 is absorbed by TiN of second layer 13 and oxidization of substrate 10 is suppressed, the capacity is stabilized.

Furthermore, a withstand voltage of first layer 12 made of aluminum oxide is high, and thus, a leakage current can be reduced.

As a result, in Example 1, a large capacity can be achieved, and the leakage current can be reduced.

When the chemical conversion voltage is 2 V, the leakage current can be reduced also in Comparative Examples 2 and 3. This is because the crystalline property of titanium is low. When the chemical conversion voltage is increased, the crystalline property is enhanced, and thus, the leakage current is increased. In Example 1, as shown in Table 1, even when a chemical conversion voltage is increased, the leakage current can be reduced.

Furthermore, in this Example, third layer 14 and first layer 12 including oxide as a main component are thinner than second layer 13. Therefore, the film thickness of an insulating part is reduced, and thus the electrostatic capacity can be increased.

Furthermore, in this Example, first layer 12 made of aluminum oxide is thinner than third layer 14 that is titanium nitride oxide. That is to say, by reducing a film thickness of first layer 12 having a low dielectric constant, the electrostatic capacity can be increased.

In Comparative Example 1, because a withstand voltage of aluminum oxide layer 15 is high, a leakage current value is small but the electrostatic capacity is small.

In Comparative Example 2, because the dielectric constant of titanium dioxide layer 17 is high, the electrostatic capacity is large but, crystallization of titanium dioxide layer 17 is promoted with the increase of the chemical conversion voltage, and thus, a leakage current value becomes extremely large.

Also in Comparative Example 3, because the dielectric constant of titanium oxide layer 19 and titanium dioxide layer 20 are high, the electrostatic capacity is high, but crystallization of titanium oxide layer 19 and titanium dioxide layer 20 is promoted with the increase of the chemical conversion voltage, and the leakage current value is increased.

In Comparative Example 4, the leakage current value can be reduced by aluminum oxide layer 21, but protrusions 24 are not formed on the surface of titanium dioxide layer 22. Therefore, only the dielectric constant can be increased but it is difficult to increase the electrostatic capacity.

In Example 1, the atomic concentration of oxygen has two local maximum values in the depth direction of anode foil 2. That is to say, second layer 13 having high conductivity including non-oxide as a main component is formed between insulating first layers 12 and third layer 14 including oxide as a main component.

Figure 18A:
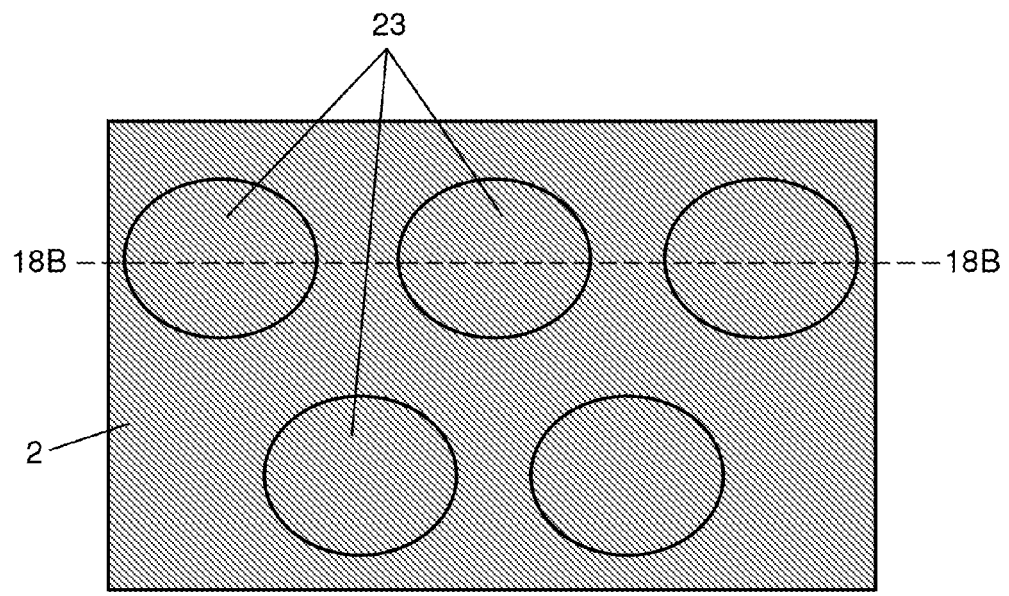
FIG. 18A is a top view of another anode foil in accordance with the exemplary embodiment of the present invention.
Figure 18B:
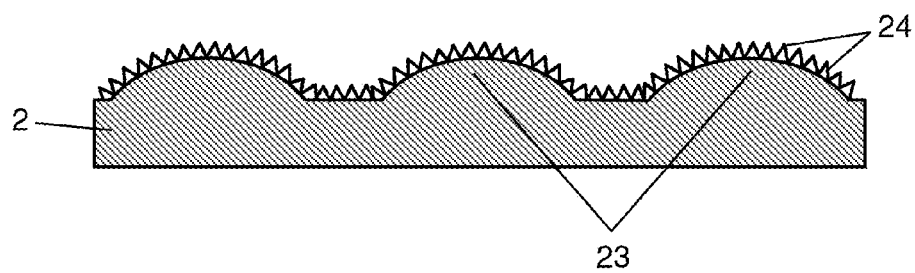
FIG. 18B is a sectional view taken on line 18B-18B of FIG. 18A.

FIG. 18A is a top view of another anode foil in accordance with the exemplary embodiment of the present invention. FIG. 18B is a sectional view taken on line 18B-18B of FIG. 18A. In this exemplary embodiment, a plurality of protrusions 24 is formed, but as shown in FIGS. 18A and 18B, a plurality of convex portions 23 having a diameter of 200 nm or more and 1000 nm or less may be formed on the surface of anode foil 2 (that is to say, the surface of third layer 14). Then, protrusions 24 may be formed on convex portion 23.

When small conical protrusions 24 are formed on large convex portions 23, a surface area can be further enlarged. Protrusions 24 in FIG. 18B correspond to protrusions 24 in FIGS. 5 and 6.

Furthermore, as cathode foil 3, an electrode foil before anode foil 2 of Example 1 is subjected to chemical conversion may be used. That is to say, cathode foil 3 includes substrate 10 made of aluminum, and a titanium nitride layer formed on substrate 10, and the surface of the titanium nitride layer includes a plurality of conical protrusions 24. The bottom surfaces of protrusions 24 have an average diameter of 10 nm or more and 150 nm or less.

This can enlarge the surface area of cathode foil 3, and increase the capacity. Furthermore, since manufacturing processes of anode foil 2 and cathode foil 3 can be made to be common to the middle, thus enhancing production efficiency.

Figure 19:
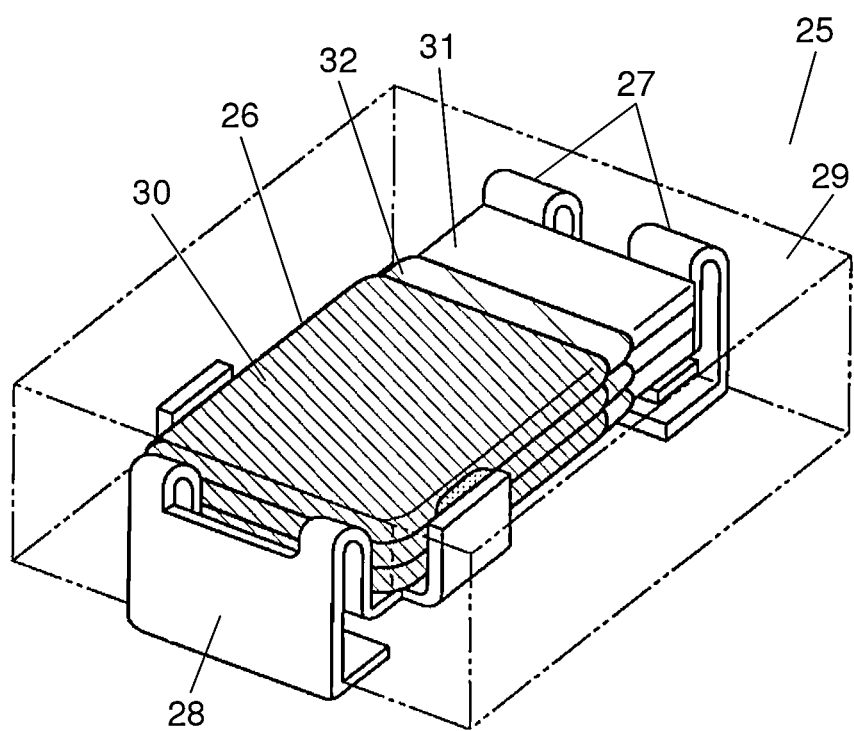
FIG. 19 is a see-through perspective view of another capacitor in accordance with the exemplary embodiment of the present invention.

FIG. 19 is a perspective view of another capacitor in accordance with the exemplary embodiment of the present invention. In FIG. 1, anode foil 2 is used for a wound-type electrolytic capacitor 1, but it can be used for capacitor 25 (laminated-type solid electrolytic capacitor) as shown in FIG. 19.

In capacitor 25, a plurality of capacitor elements 26 is laminated, and anode terminal portion 31 of each of capacitor elements 26 is connected to anode terminal 27 and cathode part 30 of each of capacitor elements 26 is connected to cathode terminal 28. Then, outer package 29 accommodates capacitor elements 26 in such a manner that a part of anode terminal 27 and a part of cathode terminal 28 are exposed.

Each of the plurality of capacitor elements 26 includes anode foil 2 (anode part) having substrate 10 and dielectric film 11, a solid electrolyte layer (not shown) formed on dielectric film 11, and a cathode layer (not shown) formed on the solid electrolyte layer. The solid electrolyte layer and the cathode layer constitute cathode part 30 of capacitor element 26. Conductive polymers such as doped polythiophene and polypyrrole are used for the solid electrolyte layer. The cathode layer is formed of a carbon layer and a silver paste layer. Regions of anode foil 2 on which cathode part 30 is not formed constitute anode terminal part 31 of capacitor element 26. Insulating part 32 may be formed between anode terminal part 31 and cathode part 30.

INDUSTRIAL APPLICABILITY

An electrode foil of the present invention is useful for capacitors that require a large capacity and a high withstand voltage.

REFERENCE MARKS IN THE DRAWINGS 1 capacitor
2, 102, 202, 302, 402 anode foil
3 cathode foil
4 separator
5 capacitor element
6 anode terminal
7 cathode terminal
8 case
9 sealing member
10 substrate
11, 111, 211, 311, 411 dielectric film
12 first layer
13 second layer
14 third layer
15 aluminum oxide layer
16 natural oxide film
17 titanium dioxide layer
18 natural oxide film
19 titanium oxide layer
20 titanium dioxide layer
21 aluminum oxide layer
22 titanium dioxide layer
23 convex portion
24 protrusion
25 capacitor
26 capacitor element
27 anode terminal
28 cathode terminal
29 outer package
30 cathode part
31 anode terminal part
32 insulating part

The invention claimed is:

1. An electrode foil comprising:
a substrate including a metal material;
a first layer including a metal oxide and formed on the substrate;
a second layer including $TiN_xO_y$ ($x>y>0$) and formed on the first layer; and
a third layer including $TiN_xO_y$ ($0<x<y$) and formed on the second layer,
wherein a plurality of protrusions are formed on a surface of the third layer.

2. The electrode foil of claim 1, wherein the third layer is thinner than the second layer.

3. The electrode foil of claim 2, wherein the first layer is thinner than the third layer.

4. The electrode foil of claim 1, wherein the first layer is thinner than the third layer.

5. The electrode foil of claim 1, wherein the metal oxide is any one of aluminum oxide, silicon oxide, titanium oxide, nickel oxide, and copper oxide.

6. The electrode foil of claim 1, wherein the plurality of protrusions are dome-like protrusions, and each diameter of bottom surfaces of the plurality of protrusions is 10 nm or more and 150 nm or less.

7. The electrode foil of claim 6, wherein a plurality of convex portions are formed on the surface of the third layer, and the plurality of protrusions are also formed on surfaces of the plurality of convex portions.

8. The electrode foil of claim 7, wherein the plurality of convex portions each have a diameter of 200 nm or more and 1000 nm or less.

9. A method for manufacturing an electrode foil, the method comprising:
    forming a titanium nitride layer on a substrate including a metal material; and
    subjecting the substrate including the titanium nitride layer to anodic oxidation for forming a first layer including a metal oxide, a second layer including $TiN_xO_y$ ($x>y>0$) on the first layer, and a third layer including $TiN_xO_y$ ($0<x<y$) on the second layer,
    wherein after the forming of the titanium nitride layer, a plurality of protrusions are formed on a surface of the titanium nitride layer.

10. The method for manufacturing an electrode foil of claim 9, wherein the plurality of protrusions are conical protrusions, and each diameter of bottom surfaces of the plurality of protrusions are 10 nm or more and 150 nm or less.

11. The method for manufacturing an electrode foil of claim 9, wherein the metal oxide is any one of aluminum oxide, silicon oxide, titanium oxide, nickel oxide, and copper oxide.

12. A capacitor comprising a capacitor element, the capacitor element including:
    an anode part formed of an electrode foil including
        a substrate including a metal material;
        a first layer including a metal oxide and formed on the substrate;
        a second layer including $TiN_xO_y$ ($x>y>0$) and formed on the first layer; and
        a third layer including $TiN_xO_y$ ($0<x<y$) and formed on the second layer, and
    a cathode part,
    wherein a plurality of first protrusions are formed on a surface of the third layer.

13. The capacitor of claim 12, wherein the cathode part includes a substrate including a conductive material, and a titanium nitride layer formed on the substrate, and
    a plurality of second protrusions are formed on a surface of the titanium nitride layer.

14. The capacitor of claim 13, wherein the plurality of second protrusions are conical protrusions, and each diameter of bottom surfaces of the plurality of second protrusions is 10 nm or more and 150 nm or less.

15. The capacitor of claim 12, wherein the metal oxide is any one of aluminum oxide, silicon oxide, titanium oxide, nickel oxide, and copper oxide.

16. The capacitor of claim 12, wherein the anode part and the cathode part are wound with a separator interposed therebetween, and the capacitor element is impregnated with a solid electrolyte.

17. The capacitor of claim 12, wherein the cathode part is formed on the anode part, and the cathode part is formed of a solid electrolyte layer and a cathode layer.

\* \* \* \* \*